(12) United States Patent
Lee et al.

(10) Patent No.: US 9,616,461 B2
(45) Date of Patent: Apr. 11, 2017

(54) ROLL MOLD, METHOD FOR FABRICATING THE SAME AND METHOD FOR FABRICATING THIN FILM PATTERN USING THE SAME

(71) Applicant: LG DISPLAY CO., LTD., Seoul (KR)

(72) Inventors: Nam-Seok Lee, Seoul (KR); Chul-Ho Kim, Paju-si (KR); Shin-Bok Lee, Daejeon (KR)

(73) Assignee: LG DISPLAY CO., LTD., Seoul (KR)

( * ) Notice: Subject to any disclaimer, the term of this patent is extended or adjusted under 35 U.S.C. 154(b) by 60 days.

(21) Appl. No.: 14/816,916

(22) Filed: Aug. 3, 2015

(65) Prior Publication Data

US 2015/0336131 A1 Nov. 26, 2015

Related U.S. Application Data

(62) Division of application No. 13/204,265, filed on Aug. 5, 2011, now Pat. No. 9,126,356.

(30) Foreign Application Priority Data

Aug. 13, 2010 (KR) .......................... 10-2010-0078308

(51) Int. Cl.
*B29C 33/40* (2006.01)
*B29D 5/00* (2006.01)
(Continued)

(52) U.S. Cl.
CPC ................ *B05D 3/12* (2013.01); *B05D 3/06* (2013.01); *B05D 5/00* (2013.01); *B29C 33/3857* (2013.01);
(Continued)

(58) Field of Classification Search
CPC ............ B29C 33/3878; B29C 33/3885; B29C 2033/385; B29C 2033/426
See application file for complete search history.

(56) References Cited

U.S. PATENT DOCUMENTS 7,765,929 B2  8/2010  Kim et al.
7,989,271 B2  8/2011  Nam et al.
(Continued)

FOREIGN PATENT DOCUMENTS

CN     1587509 A    3/2005
CN   101096160 A    1/2008
(Continued)

OTHER PUBLICATIONS

Machine translation of Japanese Patent Publication No. JP 05-189815A, originally published Jul. 30, 1993, 17 pages.

*Primary Examiner* — William Bell
(74) *Attorney, Agent, or Firm* — Birch, Stewart, Kolasch & Birch, LLP

(57) ABSTRACT

Discussed are a roll mold, a method for fabricating the same and a method for fabricating a thin film pattern using the same, which can prevent dimensional variation of the mold and simplify the overall process. The method for fabricating a thin film pattern includes providing a roll mold having a base roller provided with a light source, an adhesive resin layer formed on the base roller, a buffer layer formed on the adhesive resin layer, and a mold surface layer having a groove-protrusion shape formed on the buffer layer; forming a printing liquid on the roll mold or the substrate; and rolling the roll mold over the substrate to form a thin film pattern on the substrate. Also, the mold surface layer and the adhesive resin layer can be cured through light emitted from the light source arranged in the base roller.

5 Claims, 12 Drawing Sheets

(51) Int. Cl.
*B05D 3/12* (2006.01)
*B29C 33/38* (2006.01)
*B05D 3/06* (2006.01)
*B05D 5/00* (2006.01)
*B29C 33/42* (2006.01)
*B29C 35/08* (2006.01)

(52) U.S. Cl.
CPC ............ *B29C 33/40* (2013.01); *B29C 33/424* (2013.01); *B29C 2033/385* (2013.01); *B29C 2035/0827* (2013.01)

(56) References Cited

U.S. PATENT DOCUMENTS

| | | |
|---|---|---|
| 2010/0028540 A1 | 2/2010 | Seong et al. |
| 2010/0064918 A1 | 3/2010 | Shigeta et al. |
| 2010/0089262 A1 | 4/2010 | Seong et al. |
| 2010/0189916 A1 | 7/2010 | Watanabe |

FOREIGN PATENT DOCUMENTS

| | | |
|---|---|---|
| CN | 101221357 A | 7/2008 |
| CN | 101272918 A | 9/2008 |
| CN | 101500817 A | 8/2009 |
| CN | 101622121 A | 1/2010 |
| CN | 101632037 A | 1/2010 |
| JP | 3-198029 A | 8/1991 |
| JP | 5-189815 A | 7/1993 |
| JP | 2000-15770 A | 1/2000 |
| JP | 2010-158883 A | 7/2010 |
| KR | 10-1086083 B1 | 11/2011 |

ROLL MOLD, METHOD FOR FABRICATING THE SAME AND METHOD FOR FABRICATING THIN FILM PATTERN USING THE SAME

CROSS-REFERENCE TO RELATED APPLICATIONS

This application is a Divisional of co-pending U.S. application Ser. No. 13/204,265 filed on Aug. 5, 2011, which claims the priority benefit of Korean Patent Application No. 10-2010-0078308, filed on Aug. 13, 2010, which are all hereby incorporated by reference as if fully set forth herein.

BACKGROUND OF THE INVENTION

Field of the Invention

The present invention relates to a roll mold, a method for fabricating the same and a method for fabricating a thin film pattern using the same.

Discussion of the Related Art

A variety of flat panel display devices to reduce weight and volume of the problems of cathode ray tubes have been introduced. Examples of flat panel display devices include liquid crystal display devices, field emission display devices, plasma display panel devices and electroluminescent (EL) display devices.

Such a flat panel display device includes a plurality of thin films formed by a mask process including a series of deposition (coating), exposure to light, developing and etching processes. However, the mask process is complicated, thus disadvantageously increasing fabrication costs. Accordingly, recently, research into formation of thin films by an imprinting process using a roll mold 10, as illustrated in FIG. 1, is underway.

Such a roll mold 10 is formed by patterning the surface of a base roller 14 via an etching process. Specifically, an etch-protecting layer and a mask pattern are formed on the surface of the base roller 14. Next, the etch-protecting layer is patterned through a primary etching process using the mask pattern as a mask. The surface of the base roller 14 is patterned by a secondary etching process using the patterned etch-protecting layer as a mask to obtain a roll mold 10 provided with a groove 12.

The roll mold 10 requires two etching processes, thus complicating the overall manufacturing process. The diameter of the base roller 14 is decreased through two etching processes, thus disadvantageously causing variation in the final size of the roll mold 10 and deformation thereof.

SUMMARY OF THE INVENTION

Accordingly, the present invention is directed to a roll mold, a method for fabricating the same and a method for fabricating a thin film pattern using the same that substantially obviate one or more problems due to limitations and disadvantages of the related art.

It is one object of the present invention to provide a roll mold, a method for fabricating the same and a method for fabricating a thin film pattern using the same, to prevent dimensional variation of the roll mold and simplify the overall manufacturing process.

To achieve the object and other advantages and in accordance with the purpose of the invention, as embodied and broadly described herein, provided is a method for fabricating a roll mold including: providing a substrate provided with a master pattern layer; sequentially forming a mold surface layer and a solid buffer layer on the substrate provided with the master pattern layer to provide a flat panel mold; forming an adhesive resin layer on the base roller aligned on the flat panel mold; and rolling the base roller provided with the adhesive resin layer over the flat panel mold to adhere the flat panel mold to the base roller through the adhesive resin layer.

The surface of the master pattern layer contacting the mold surface layer may be surface-treated with a hydrophobic material such as flurooctyl-trichloro-silane (FOTS) or (heptadecafluoro-1,1,2,3-tetrahydrodecyl)trichlorosilane (RDFS).

In one embodiment, the step of providing the flat panel mold may include: forming the mold surface layer on the master pattern layer; forming the buffer layer on the mold surface layer, while one end of the flexible substrate is adhered to an unwinder and the other end of the flexible substrate is adhered to a rewinder and keeping the buffer layer level; rolling the base roller over the buffer layer and curing the mold surface layer using a light source arranged in the base roller; and cutting the buffer layer to a size of the mold surface layer, wherein the adhesion of the flat panel mold to the base roller through the adhesive resin layer further includes: curing the adhesive resin layer using the light source in the base roller.

In another embodiment, the step of providing the flat panel mold may include: forming the mold surface layer on the master pattern layer; forming the buffer layer on the mold surface layer, while one end of the flexible substrate is adhered to an unwinder and the other end of the flexible substrate is adhered to a rewinder and keeping the buffer layer level; and cutting the buffer layer to a size of the mold surface layer, and wherein the adhesion of the flat panel mold to the base roller through the adhesive resin layer further includes: curing the mold surface layer and the adhesive resin layer using the light source arranged in the base roller.

In accordance with another aspect of the present invention, provided is a roll mold including: a base roller provided with a light source; an adhesive resin layer formed on the base roller; a buffer layer formed on the adhesive resin layer; and a mold surface layer having a groove-protrusion shape formed on the buffer layer, wherein the mold surface layer and the adhesive resin layer are cured through light emitted from the light source arranged in the base roller.

The mold surface layer may be made of a photocurable mold resin such as urethane-acrylate or polydimethylsiloxane, the buffer layer may be formed of a flexible substrate, and the adhesive resin layer may be made of a photocurable adhesive.

In accordance with another aspect of the present invention, provided is an apparatus for fabricating a roll mold, including: a stage, on which a substrate provided with a master pattern layer is mounted; a first supply nozzle to apply a liquid mold surface layer onto the master pattern layer; an unwinder and a rewinder to fix both ends of the liquid buffer layer, such that the solid buffer layer is formed on the liquid mold surface layer, while maintaining the solid buffer layer level; a dicing unit to cut the buffer layer to the same size as the mold surface layer; and a second supply nozzle to apply a liquid mold surface layer onto the base roller rolling over the buffer layer.

The apparatus may further include: a light source arranged in the base roller, the light source curing the liquid mold surface layer and the liquid adhesive resin layer; and a camera removably adhered to the base roller, to align the base roller on the buffer layer.

In accordance with another aspect of the present invention, provided is a method for fabricating a thin film pattern, including: providing a roll mold comprising a base roller provided with a light source, an adhesive resin layer formed on the base roller, a buffer layer formed on the adhesive resin layer, and a mold surface layer having a groove-protrusion shape formed on the buffer layer; forming a printing liquid on the roll mold or the substrate; and rolling the roll mold over the substrate to form a thin film pattern on the substrate, wherein the mold surface layer and the adhesive resin layer are cured through light emitted from the light source arranged in the base roller.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE INVENTION

Hereinafter, the present invention will be described with reference to the annexed drawings.

Figure 1:
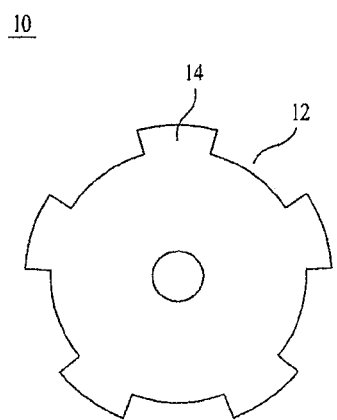
FIG. 1 is a sectional view illustrating a conventional roll mold.
Figure 2:
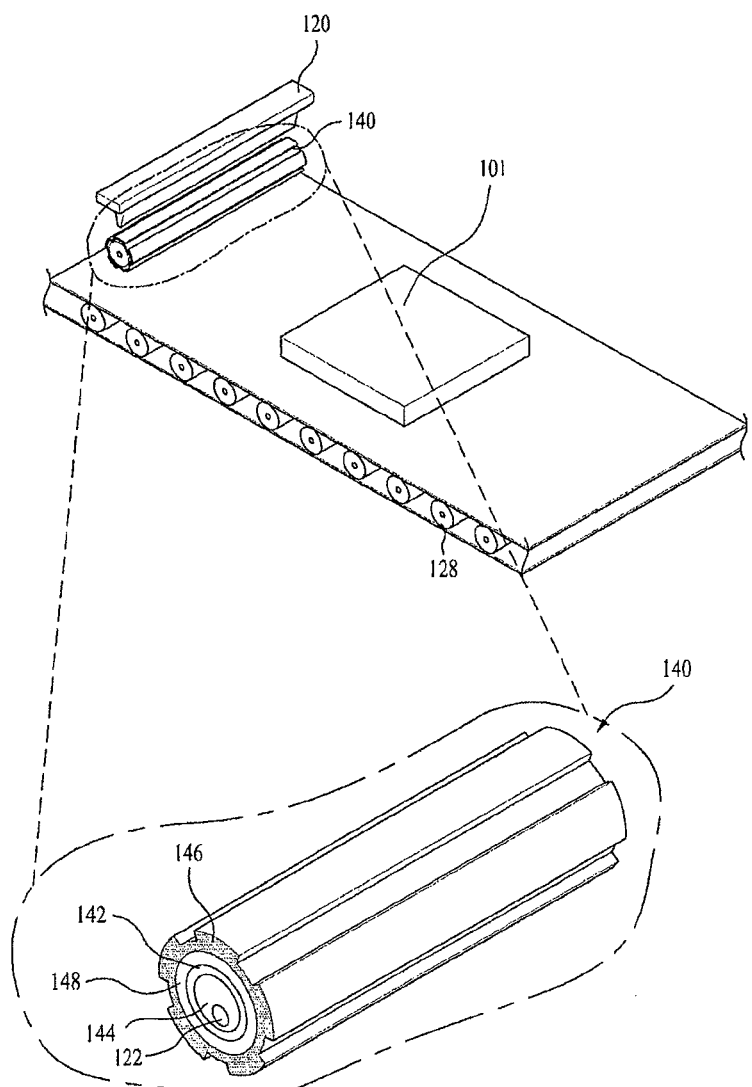
FIG. 2 is a perspective view illustrating a printing or imprinting device for forming a thin film pattern according to the present invention.

FIG. 2 is a perspective view illustrating a printing or imprinting device for forming a thin film pattern according to the present invention.

The printing or imprinting device in FIG. 2 includes a printing liquid supplier 120 and a roll mold 140.

The printing liquid supplier 120 stores a printing liquid. The stored printing liquid is supplied to a roll mold 140 using a printing method, or supplied to a substrate 101 using an imprinting method in the process of patterning the thin film.

The roll mold 140 rotates over a substrate 101 such that it contacts the substrate 101 conveyed by a conveyor 128. Alternatively, the roll mold 140 may move so as to roll over the substrate 101 while the substrate 101 is fixed.

A printing liquid from the printing liquid supplier 120 fills a groove of the roll mold 140 by a printing method during the thin-film patterning process. The printing liquid in the groove of the roll mold 140 is transcribed onto the substrate 101, while the roll mold 140 is rolled over the substrate 101.

In addition, the roll mold 140 is rolled over the substrate 101, to which the printing liquid is applied, using an imprinting method during the thin-film patterning, such that it comes into contact therewith.

Such a roll mold 140 includes a base roller 144, an adhesive resin layer 142, a buffer layer 148 and a mold surface layer 146.

The mold surface layer 146 is made of a photocurable material such as urethane-acrylate or polydimethylsiloxane. The mold surface layer 146 is formed so as to have a groove and a protrusion having the same shape as the pattern to be formed on the substrate 101, or the reverse shape thereof.

The buffer layer 148 offsets stress applied from the roll mold to the substrate 101 when the roll mold 140 is rolled over the substrate 101 and comes into planar contact with the base roller 144 in the process of fabricating the roll mold 140.

The adhesive resin layer 142 adheres the base roller 144 to the buffer layer 148. In addition, the adhesive resin layer 142 is formed of a photocurable adhesive such as a sealant between the base roller 144 and the buffer layer 148.

A light source 122, as a curing apparatus to cure the mold surface layer 148 and the adhesive resin layer 142 is arranged in the base roller 144. The light source 122 produces ultraviolet light and is surrounded by a light source housing (represented by reference numeral "124" in FIG. 3C). That is, the light source housing 124 surrounds the surface of the light source 122, except for the surface of the light source 122 facing the stage. At this time, the light source 122 and the light source housing 124 do not rotate together the rotating base roller 144, instead remaining stationary.

In addition, a camera (represented by reference numeral "126" in FIG. 3C) to assist in aligning the base roller 144 is arranged in the base roller 144. Specifically, the camera 126 aligns the base roller 144 when the base roller 144 is arranged on the buffer layer 148 and when the base roller 144, to which the adhesive resin layer 142 has been applied, is arranged on the buffer layer 148. The camera 126 is removably mounted in the base roller 144, which is adhered in the process of alignment, and is detached after completion of alignment.

FIGS. 3A to 3E are sectional views illustrating a method for fabricating the roll mold illustrated in FIG. 2 according to a first embodiment.

Figure 3A:
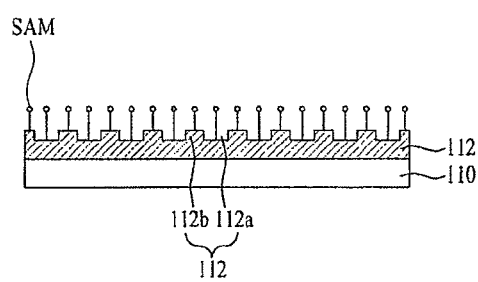
FIGS. 3A to 3E are sectional views illustrating a method for fabricating the roll mold illustrated in FIG. 2 according to a first embodiment.

As shown in FIG. 3A, a master pattern layer 112 having a groove pattern 112a and a protrusion pattern 112b is formed on a master substrate 110 having a flat surface. The master pattern layer 112 is formed by applying an organic material, which can be stripped, such as photoresist, and patterning the material through photolithography, holographic lithography, laser processing, electron beam processing, focused ion beam processing or the like. Meanwhile, the master pattern layer 112 and the master substrate 110 are separately formed, or a master pattern whose surface has a groove pattern and a protrusion pattern may be formed by patterning the master substrate 110.

The master pattern layer 112 may be surface-treated with a self-assembled monolayer (SAM) to facilitate release (detachment) of the master pattern layer 112 from the mold surface layer 146. Accordingly, adhesion of the masker pattern layer 112 to the roll mold 140 along the mold surface layer 146 can be prevented, when the master pattern layer 112 is released from the mold surface layer 146. The self-assembled monolayer (SAM) is made of a hydrophobic material such as flurooctyl-trichloro-silane (FOTS) or (heptadecafluoro-1,1,2,3-tetrahydrodecyl)trichlorosilane (HDFS).

Figure 3B:
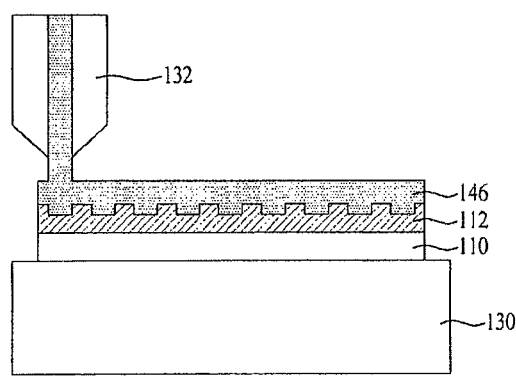

Then, as shown in FIG. 3B, a mold resin liquid is applied through a first supply nozzle 132 onto the master pattern layer 112 to form a mold surface layer 146. A lower surface of the mold surface layer 146 which contacts the master pattern layer 112 is formed into a protrusion-groove shape along a protrusion 112*b* and a groove 112*a* of the mask pattern layer 112. The mold surface layer 146 has a flat upper surface and is formed into a protrusion-groove shape along a protrusion 112*b* and a groove 112*a* of the mask pattern layer 112. The mold surface layer 146 is made of a photo-curable mold resin liquid such as urethane-acrylate or polydimethylsiloxane.

Figure 3C:
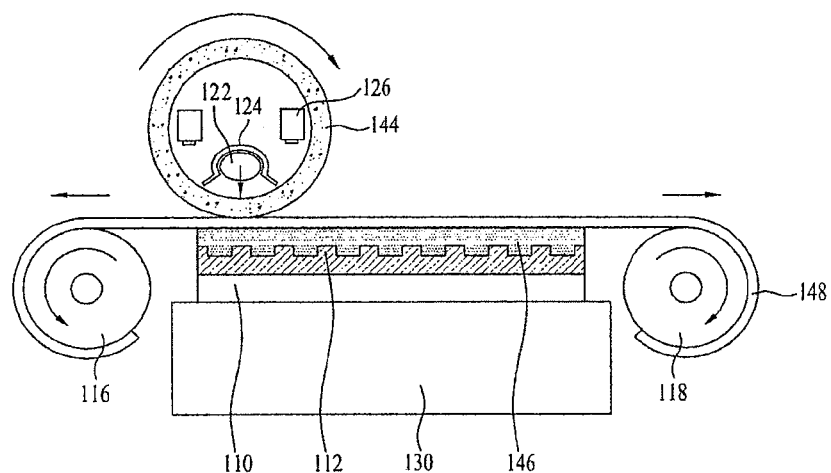

Then, as shown in FIG. 3C, the buffer layer 148, which is rolled on a rewinder 118 and an unwinder 116 and thus maintains a parallel state, is aligned with the mold surface layer 146. Then, both sides of the base roller 114 are aligned on the buffer layer 148 through an alignment key (not shown) and the camera 126 formed in at least one of a stage 130, a master substrate 110, a master pattern layer 112 and a mold pattern layer 146. The camera 126 performs imaging to confirm whether an alignment key arranged at both sides of the base roller 144 corresponds to both sides of the base roller 144, thus improving alignment accuracy.

The base roller 144 aligned on the buffer layer 148 is rolled over the buffer layer 148. Accordingly, printing pressure generated by the rotation of the base roller 144 is applied to the buffer layer 148 and tension is applied to the buffer layer 148 through the rewinder 118 and the unwinder 116. In addition, the mold surface layer 146 is cured through the light source 122 arranged in the base roller 144 rotating on the buffer layer 148.

Meanwhile, the base roller 144 of the present invention is rolled over the buffer layer 148, while the base roller 144 comes into planar contact with the solid buffer layer 148. In this case, the base roller 144 does not slide on the cured solid buffer layer 148 and alignment accuracy between the buffer layer 148 and the base roller 144 is improved, thus improving pattern accuracy. In addition, the solid buffer layer 148 comes into planar contact with the base roller 144, thus relatively increasing the contact area between the buffer layer 148 and the base roller 144, and curing the mold surface layer 146 even with a low amount of light and in a relatively short period of time.

On the other hand, a conventional base roller rotates while directly contacting a liquid mold surface layer without any buffer layer and coming into linear contact with the liquid mold surface layer. In this case, the base roller may slide on the uncured liquid mold surface layer, thus reducing alignment accuracy between the buffer layer and the base roller and reducing pattern accuracy. In addition, the liquid mold surface layer comes into linear contact with the base roller, thus relatively reducing the contact area between the buffer layer and the base roller and necessitating curing of the mold surface layer with a high amount of light for a relatively long time.

Figure 3D:
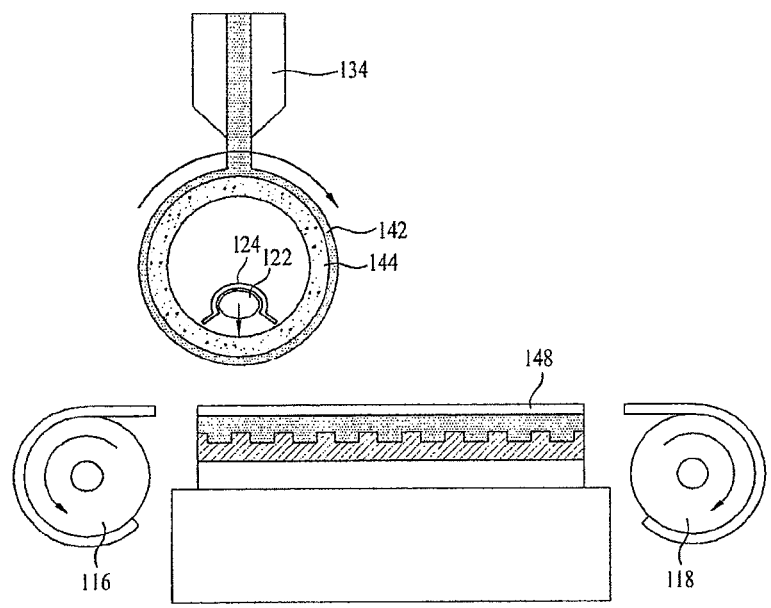

Next, as shown in FIG. 3D, the buffer layer 148 is cut to the same size as the mold surface layer 146 through a dicing process using a dicing unit (not shown) to obtain a flat panel mold including the mold surface layer 146 and buffer layer 148. At the same time or after a while, the adhesive resin layer 142 is applied onto the base roller 144 through a second supply nozzle 134. The adhesive resin layer 142 may be applied to the base roller 144 through the first supply nozzle 132 shown in FIG. 3B, instead of through the second supply nozzle 134.

Figure 3E:
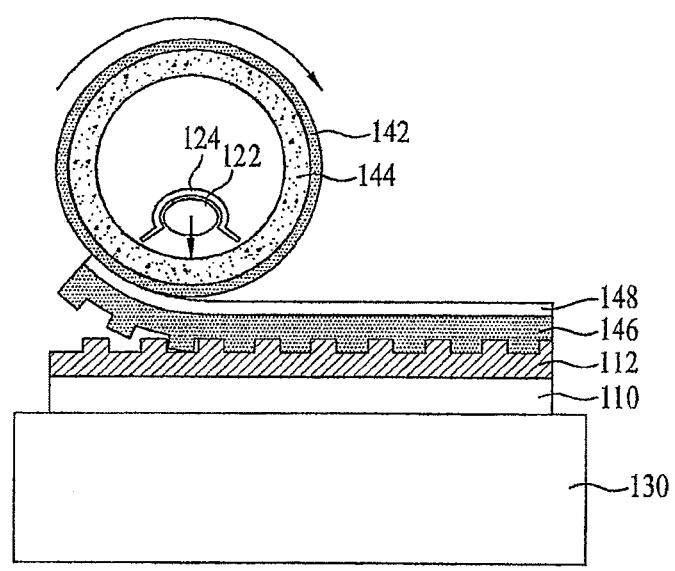

Next, as shown in FIG. 3E, the base roller 144, to which the adhesive resin layer 142 is applied, is rolled over the buffer layer 148. At the same time, a light source 122 arranged in the base roller 144 is turned on and the adhesive resin layer 142 is cured through light emitted from the light source 122. Accordingly, the flat panel mold including the mold surface layer 146 and the buffer layer 148 is adsorbed and fixed on the base roller 144 through the adhesive resin layer 142 to obtain a roll mold 140 having a groove and protrusion.

FIGS. 4A to 4D are sectional views illustrating a method for fabricating the roll mold shown in FIG. 2 according to a second embodiment. This second embodiment is different from the first embodiment in that the mold surface layer 146 and the adhesive resin layer 142 are simultaneously cured.

Figure 4A:
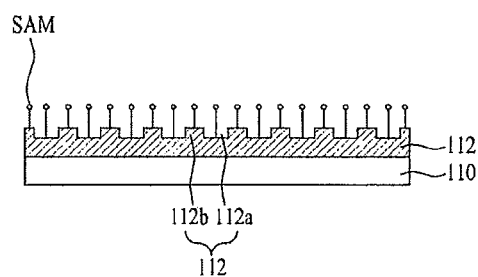
FIGS. 4A to 4D are sectional views illustrating a method for fabricating the roll mold shown in FIG. 2 according to a second embodiment.
Figure 4B:
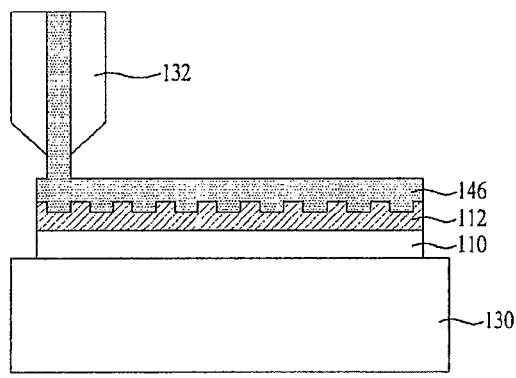
Figure 4C:
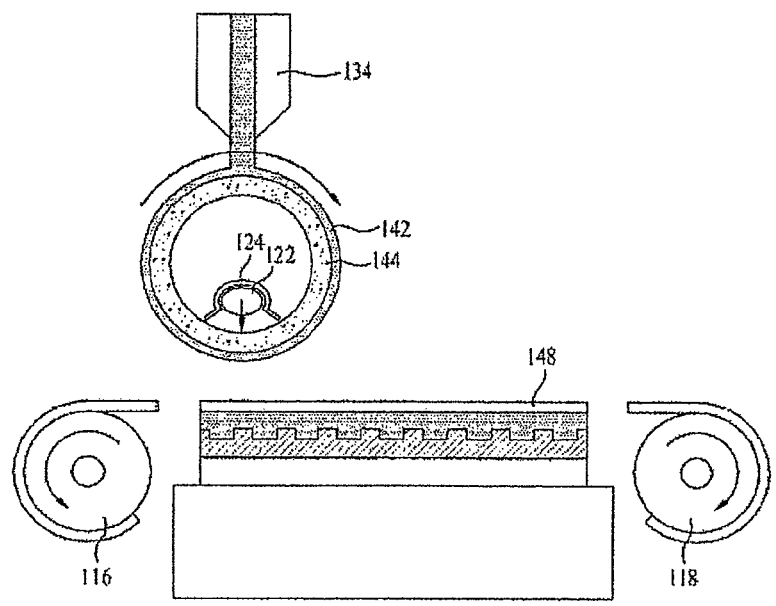

Specifically, as shown in FIG. 4A, a master pattern layer 112 having a groove pattern 112*a* and a protrusion pattern 112*b* is formed on a master substrate 110 having a flat surface. The master pattern layer 112 having a groove pattern 112*a* and a protrusion pattern 112*b* is formed on a master substrate 110 having a flat surface. Next, as shown in FIG. 4B, a mold resin liquid is applied onto the master pattern layer 112 through the first supply nozzle 132 to form a mold surface layer 146. Next, as shown in FIG. 4C, the buffer layer 148 which is rolled on a rewinder 118 and an unwinder 116, and thus maintains a parallel state, is formed on the mold surface layer 146. Next, the buffer layer 148 is cut to the same size as the mold surface layer 146 through a dicing process using a dicing unit (not shown) to obtain a flat panel mold including the mold surface layer 146 and buffer layer 148. At the same time or after a while, the adhesive resin layer 142 is applied through the second supply nozzle 134 onto the base roller 144.

Figure 4D:
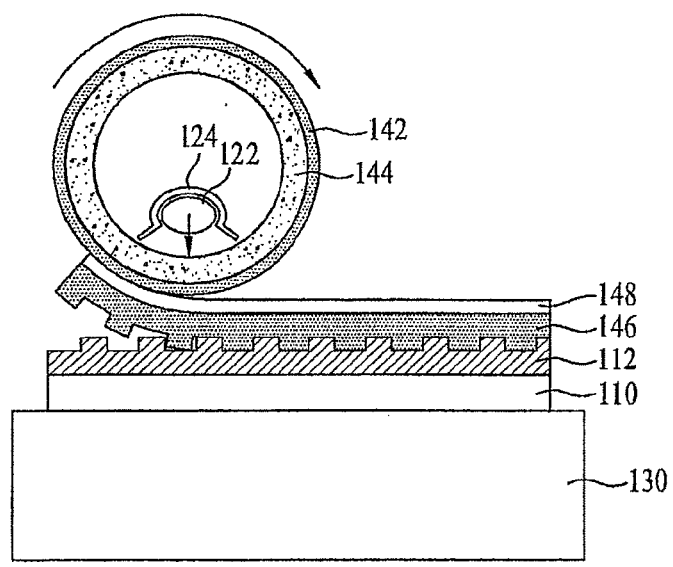

Next, as shown in FIG. 4D, both sides of the base roller 114, to which the adhesive resin layer 142 is applied, are aligned on the buffer layer 148 using an alignment key (not shown) and the camera 126 formed on at least one of a stage 130, a master substrate 110, a master pattern layer 112 and a mold pattern layer 146. Next, a light source 122 arranged in the base roller 144 is turned on and the adhesive resin layer 142 is cured through light emitted from the light source 122. Accordingly, the flat panel mold including the mold surface layer 146 and buffer layer 148 is adsorbed and fixed on the base roller 144 through the adhesive resin layer 142 to obtain a roll mold 140 having a groove and protrusion.

Figure 5A:
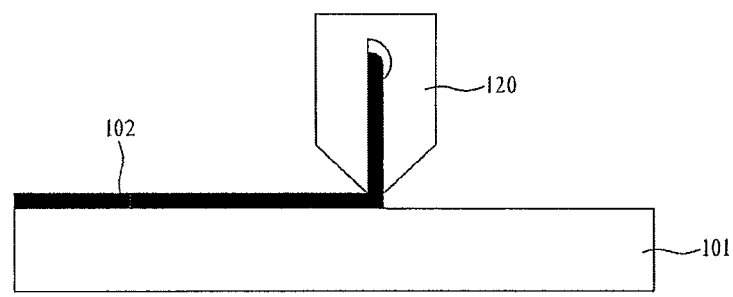
FIGS. 5A to 5C are views illustrating a method for patterning a thin film via an imprinting method employing the roll mold of the present invention according to a first embodiment.
Figure 5B:
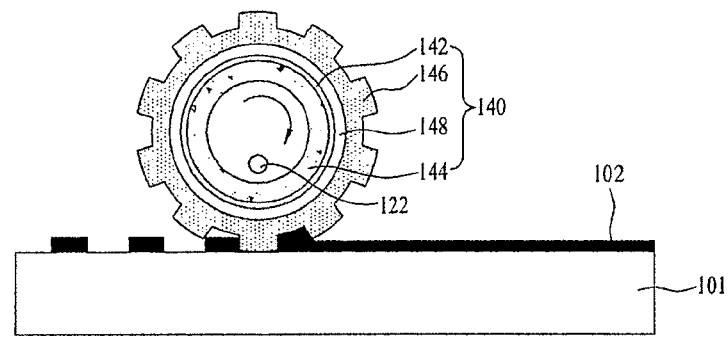
Figure 5C:
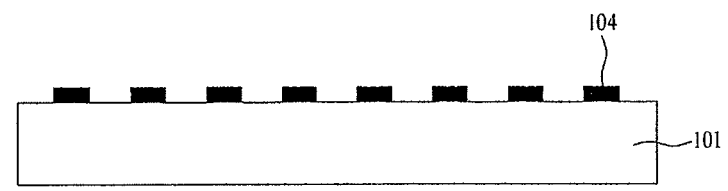

FIGS. 5A to 5C are views illustrating a method for patterning a thin film via an imprinting method employing the roll mold of the present invention according to a first embodiment.

As shown in FIG. 5A, a printing liquid 102 is applied to a substrate 101 through a printing liquid supplier 120. Then, as shown in FIG. 5B, a roll mold 140 including a base roller 144, an adhesive resin layer 142, a buffer layer 148 and a master pattern layer 146 is aligned on the substrate 101.

Next, the roll mold 140 is rolled over the substrate 101. At this time, the printing liquid 102 is cured through a curing apparatus, such as a UV lamp, provided in the base roller 144 of the roll mold 140, or a curing apparatus provided on the rear surface of the substrate 101. As a result, as shown in FIG. 5C, the printing liquid 102 is formed in the form of a thin film pattern 104 on the substrate 101.

Figure 6A:
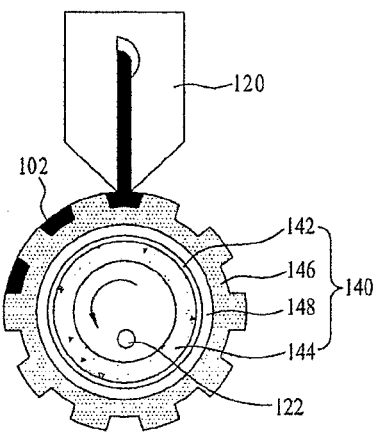
FIGS. 6A to 6C are views illustrating a method for patterning a thin film via a printing method employing the roll mold of the present invention according to a second embodiment.
Figure 6B:
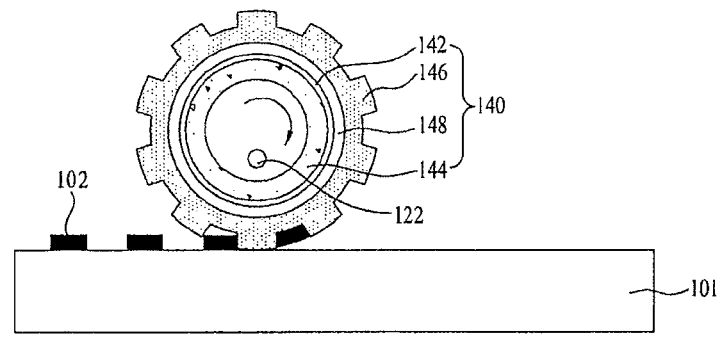
Figure 6C:
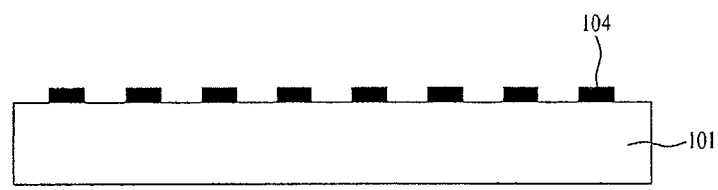

FIGS. 6A to 6C are views illustrating a method for patterning a thin film via a printing method employing the roll mold of the present invention according to a second embodiment.

As shown in FIG. 6A, a roll mold 140 including a base roller 144, an adhesive resin layer 142, a buffer layer 148 and a master pattern layer 146 is provided. The printing liquid 102 supplied from the printing liquid supplier 120 fills the groove of the roll mold 140.

Next, as shown in FIG. 6B, the roll mold 140 filled with the printing liquid 102 is rolled over the substrate 101. Accordingly, the printing liquid 102 is cured through a curing apparatus, such as a UV lamp, provided in the base roller 144 of the roll mold 140, or a curing apparatus provided on the rear surface of the substrate 101. Accordingly, the printing liquid 102 is transcribed, dried and cured on the substrate 101 and is thus formed into a thin film pattern, as shown in FIG. 6C.

FIGS. 7A to 7D are views illustrating a method for patterning a thin film via a printing method employing the roll mold of the present invention according to a third embodiment.

Figure 7A:
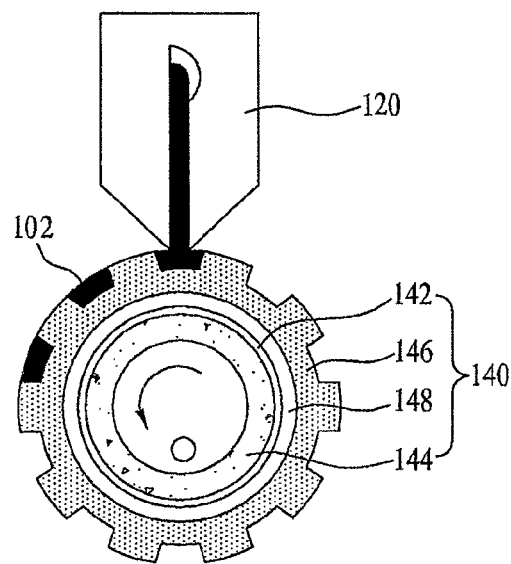
FIGS. 7A to 7D are views illustrating a method for patterning a thin film via a printing method employing the roll mold of the present invention according to a third embodiment.

As shown in FIG. 7A, a roll mold 140 including a base roller 144, an adhesive resin layer 142, a buffer layer 148 and a master pattern layer 146 is provided. The printing liquid 102 supplied by the printing liquid supplier 120 fills the groove of the roll mold 140.

Figure 7B:
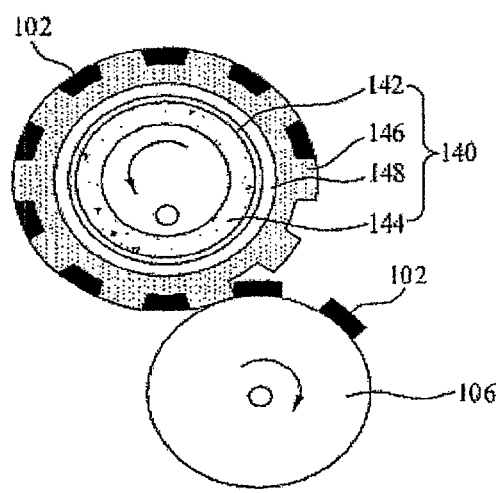
Figure 7C:
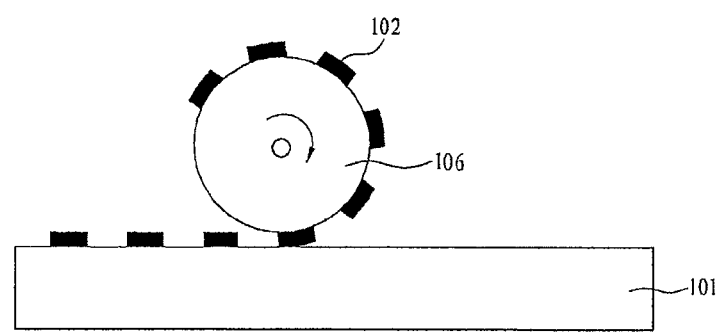

Next, as shown in FIG. 7B, the printing liquid 102 is transcribed to a transcription roller 106, which rotates, and, at the same time, is engaged in the roll mold 140. The transcription roller 106 provided with the printing liquid 102 is rolled over the substrate 101, as shown in FIG. 7C. Accordingly, the printing liquid 102 is transcribed, dried and cured on the substrate 101 and is thus formed into a thin film pattern, as shown in FIG. 7D.

Figure 7D:

As such, the thin film pattern 104 shown in FIGS. 5C, 6C and 7D may be used to form thin or thick films on flat panel display devices such as plasma display panels, electroluminescent (EL) display panels and field emission display devices as well as liquid crystal display panels.

Figure 8:
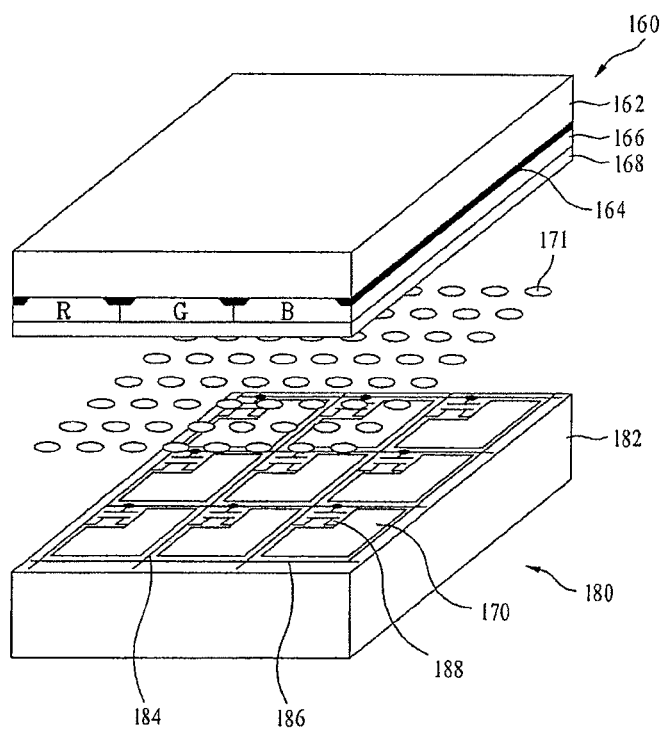
FIG. 8 is a perspective view illustrating a liquid crystal display panel formed via the method of fabricating a thin film pattern according to the present invention.

Specifically, the liquid crystal display panel according to the present invention shown in FIG. 8 includes a thin film transistor substrate 180 and a color filter substrate 160 such that a liquid crystal layer 171 is interposed between the thin film transistor substrate 180 and the color filter substrate 160.

The color filter substrate 160 includes a black matrix 164, a color filter 166, a common electrode 168 and a column spacer (not shown) arranged on an upper substrate 162 in this order.

The thin film transistor substrate 180 includes a plurality of gate lines 186 and a plurality of data lines 184 which cross each other on a lower substrate 182, a thin film transistor 188 adjacent to each intersection between the gate lines 186 and the data lines 184, and a pixel electrode 170 formed at a pixel region provided by the intersection.

An organic pattern used as a mask for patterning a thin film pattern made of an organic material such as the color filter 166, the black matrix 164 and the column spacer of the liquid crystal display panel and for patterning a thin film pattern made of an inorganic material such as the thin film transistor 188, gate lines 186, data lines 184 and pixel electrode 170 of the liquid crystal display panel may be formed by a printing process using the roll mold according to the present invention.

The present invention forms a roll mold using application and transcription processes without using any conventional etching process, thus reducing fabrication process complexity and costs, and preventing dimensional variation of a roll mold caused by the etching process. In addition, a process for forming a flat panel mold and a process for adhering the flat panel mold to a base roller are performed in one apparatus in an inline manner. In addition, according to the present invention, the adhesive resin layer and the mold surface layer are cured by at least two light-exposure processes using a light source arranged in a base roller, thus reducing fabrication time and cost. In addition, according to the present invention, the base roller rotates and, at the same time, the flat panel mold is adhered to the base roller, thus increasing the thickness of the flat panel mold and pattern uniformity. In addition, according to the present invention, the roll mold is formed under the conditions of the same tension, roll pressure and heat as in a roll-to-roll imprinting process in which the roll mold rotates to form a thin film pattern, thus compensating for substrate deformation due to tension, pressure and heat in the roll-to-roll imprint process.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method for fabricating a thin film pattern for a display device, comprising:
   providing a roll mold comprising a base roller provided with a light source, an adhesive resin layer formed on the base roller, a buffer layer formed on the adhesive resin layer, and a mold surface layer having a groove-protrusion shape formed on the buffer layer;
   forming a printing liquid on the roll mold or the substrate; and
   rolling the roll mold over the substrate to form a thin film pattern on the substrate,
   wherein the providing a roll mold comprises:
      providing a substrate provided with a master pattern layer;
      sequentially forming a mold surface layer and a solid buffer layer on the substrate provided with the master pattern layer to provide a flat panel mold;
      forming an adhesive resin layer on a base roller aligned on the flat panel mold; and
      rolling the base roller provided with the adhesive resin layer over the flat panel mold to adhere the flat panel mold to the base roller through the adhesive resin layer,
   wherein the providing of the flat panel mold comprises:
      forming the mold surface layer on the master pattern layer;
      forming the buffer layer on the mold surface layer, while one end of the buffer layer is adhered to an unwinder and the other end of the buffer layer is adhered to a rewinder, and keeping the buffer layer level; and
      cutting the buffer layer to a size of the mold surface layer, wherein the mold surface layer and the adhesive resin layer are cured through light emitted from the light source arranged in the base roller.

2. The method according to claim 1, wherein the mold surface layer is made of a photocurable mold resin such as urethane-acrylate or polydimethylsiloxane, the buffer layer is formed of a flexible substrate, and the adhesive resin layer is made of a photocurable adhesive.

3. The method according to claim 1, wherein the surface of the master pattern layer contacting the mold surface layer is surface-treated with a hydrophobic material comprising at least one selected from flurooctyl-trichloro-silane (FOTS) and (heptadecafluoro-1,1,2,3-tetrahydrodecyl)trichlorosilane (HDFS).

4. The method according to claim 1, wherein the providing of the flat panel mold further comprises:

subsequent to forming the buffer layer on the mold surface layer, rolling the base roller over the buffer layer, wherein the mold surface layer is cured when rolling the base roller over the buffer layer, and wherein the adhesive resin layer is cured when rolling the base roller provided with the adhesive resin layer over the flat panel mold.

5. The method according to claim 1, wherein the mold surface layer and the adhesive resin layer are simultaneously cured using the light source arranged in the base roller when rolling the base roller provided with the adhesive resin layer over the flat panel mold.

* * * * *